Dec. 22, 1970     L. F. SIBLEY     3,549,199
COVER FOR TRUCKS
Original Filed April 11, 1967     3 Sheets-Sheet 1
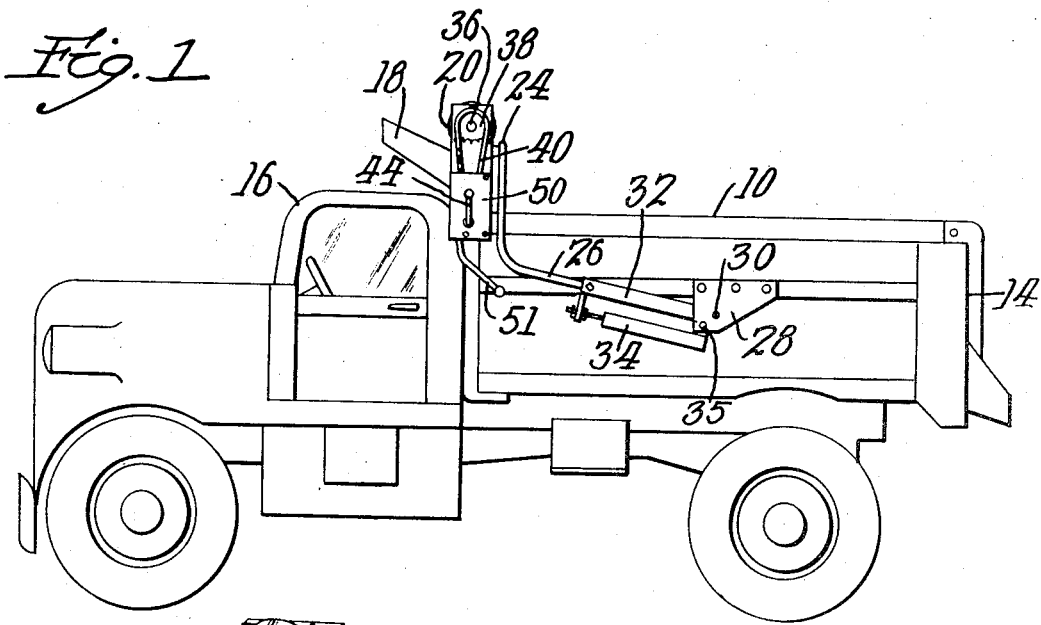
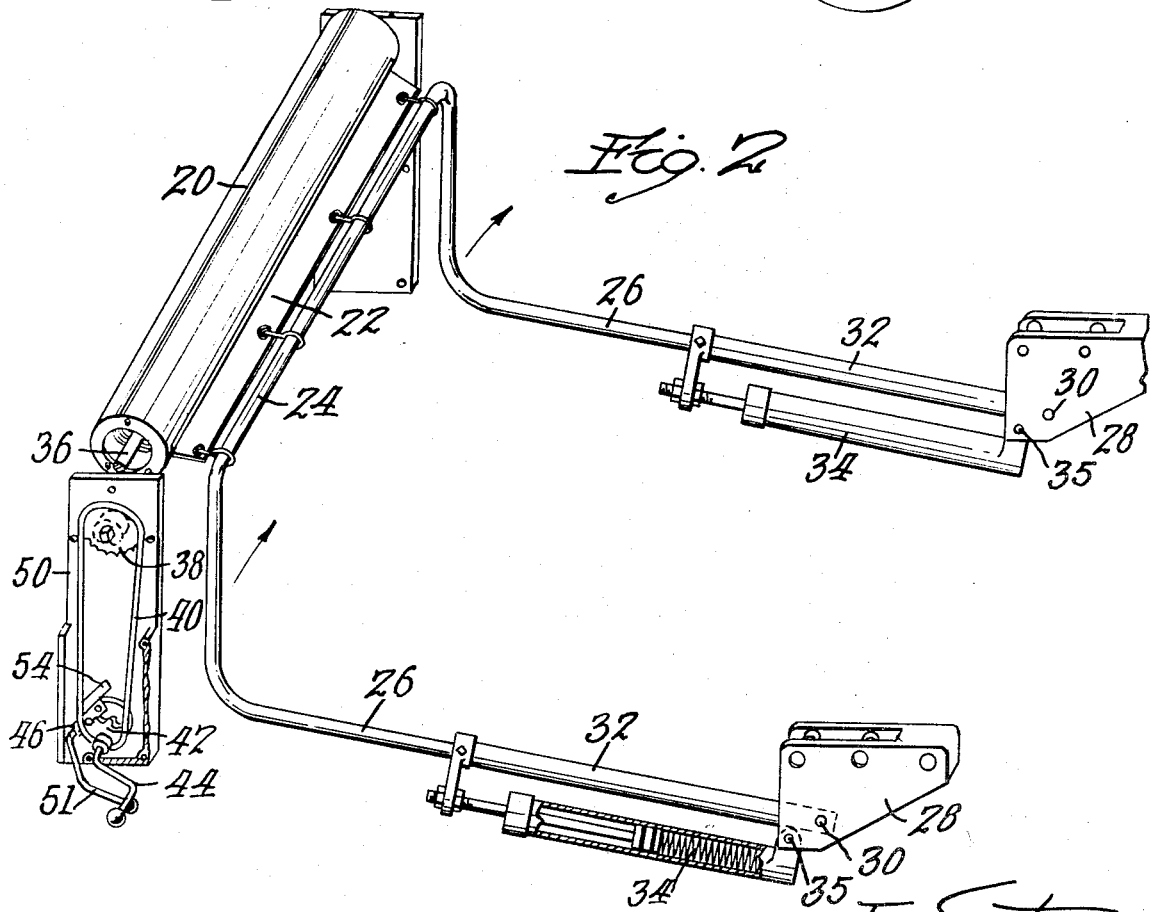
Inventor
Louis F. Sibley
By Charles R. Fay,
Attorney

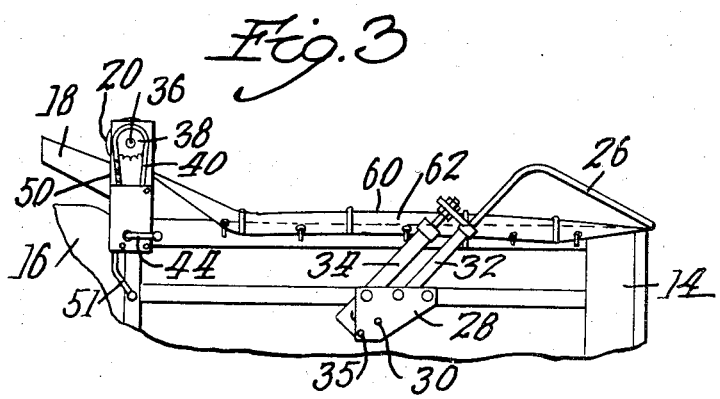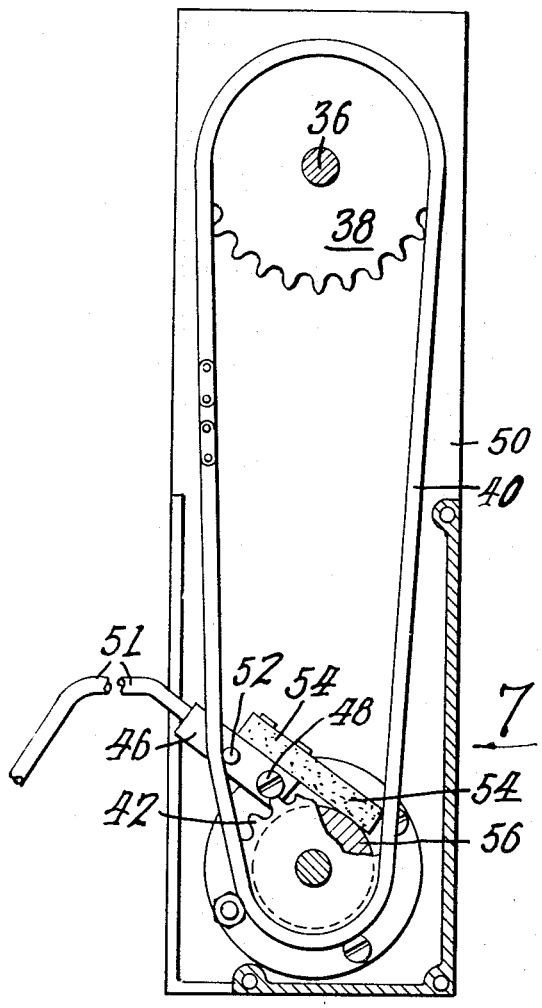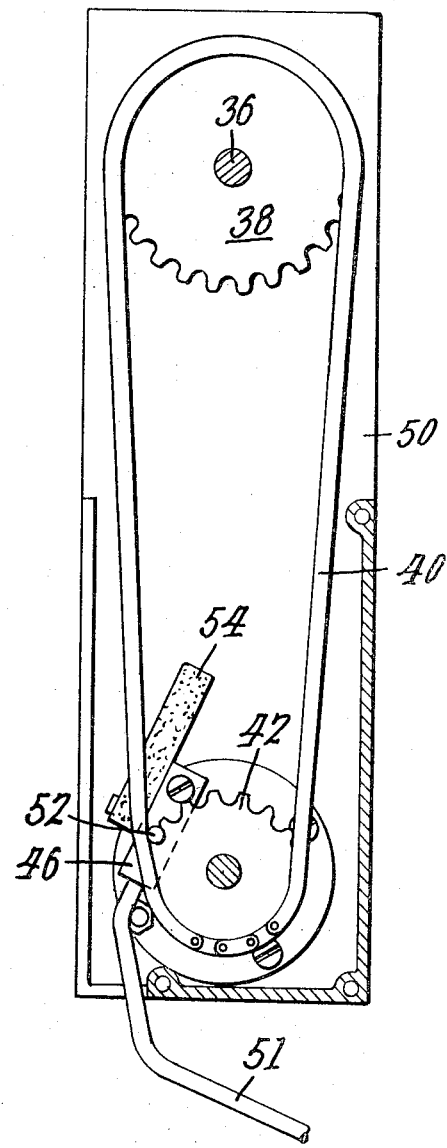

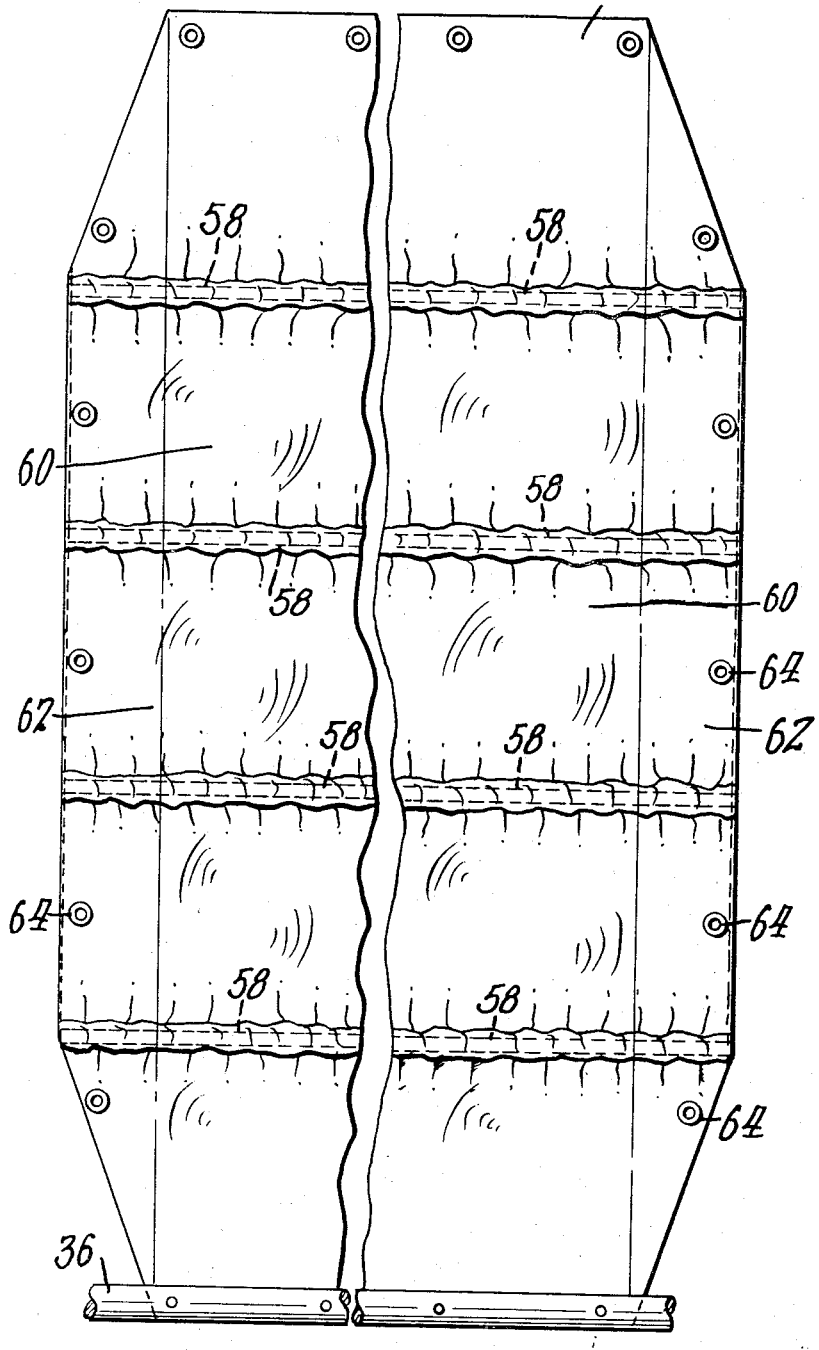
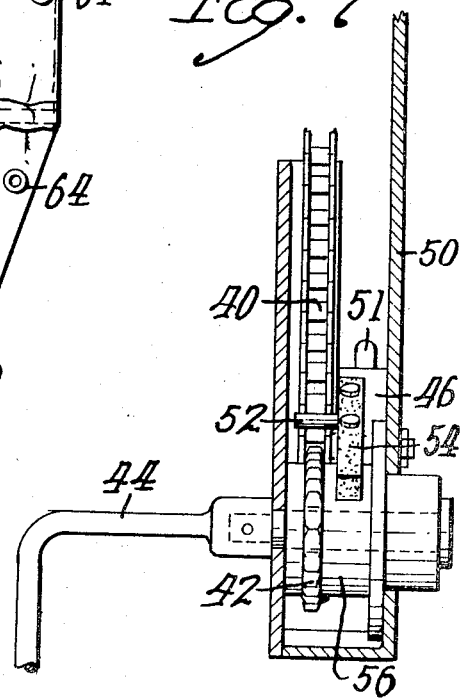

United States Patent Office 3,549,199
Patented Dec. 22, 1970

3,549,199
COVER FOR TRUCKS
Lewis F. Sibley, Hardwick, Mass., assignor, by mesne assignments, to Pioneer Coveralls, Inc., Ware, Mass., a corporation of Massachusetts
Continuation of application Ser. No. 630,011, Apr. 11, 1967. This application July 7, 1969, Ser. No. 845,631
Int. Cl. B60p 7/02
U.S. Cl. 296—100                    9 Claims

ABSTRACT OF THE DISCLOSURE

A generally automatically actuated cover for an open vehicle body comprising a rolled-up cover, a lock for holding it rolled, spring means for extending the cover to a covering position on the vehicle body, crank means associated with the lock means for rolling the cover back into the cylindrical container which is mounted e.g. on the headboard of a truck.

---

This application is a continuation of Ser. No. 630,011, filed Apr. 11, 1967, and now abandoned.

This invention relates to an improvement over the invention in truck covers disclosed in my copending patent application Ser. No. 591,482 filed Jan. 10, 1966.

The principal object of the present invention resides in an improvement of the construction as shown in the above identified application resulting in easier operation of the parts thereof especially in releasing the cover so that it automatically extends by springs means to completely cover the body of the truck, together with easier operated locking means and means for rolling up and locating the cover in the headboard at the cab of the truck.

A further object of the invention resides in the provision of a new and improved cover which is provided with elastic means by which it may be more easily secured in a more fully covering position relative to materials in the truck.

Other objects and advantages of the invention will appear hereinafter.

Reference is to be had to the accompanying drawings in which:

FIG. 1 is a view in side elevation illustrating a truck with the new cover apparatus applied thereto and showing the same in inoperative position;

FIG. 2 is a perspective view showing the apparatus in inoperative position;

FIG. 3 illustrates the cover in its operative position wherein the truck is fully covered;

FIGS. 4 and 5 illustrate the lock and rewind mechanism;

FIG. 6 is a view in elevation illustrating the new cover per se; and

FIG. 7 is a view looking in the direction of arrow 7 in FIG. 4.

The invention herein may be mounted on any kind of vehicle or truck body. In FIG. 1 a conventional truck is shown. This truck has an open body 10, a rear end member 14 which can be opened, a cab 16 for instance, and a headboard for the body at 18.

A cylindrical member in the form of a container and indicated at 20 is mounted on appropriate brackets on the headboard. This container houses the cover, the forward portion of which is shown in FIG. 2 at 22 having connection means with respect to a bar 24 mounted on a bail 26, 26. The bail is in general pivoted to the car body in any convenient way as by brackets 28, 28 which may carry pivots or the like 30, 30 for this purpose. The bail slides in telescopic receivers 32, 32 to accommodate different lengths of truck bodies. These bails are provided with spring devices 34, 34 which are pivoted at 35, 35 on the bracket 28, 28 which tend to swing the entire bail smoothly in a clockwise direction as particularly from the FIG. 1 to the FIG. 3 position when the locking means to be described is released.

It will be seen therefore that when the lock to be described is released, the bail moves in the direction indicated drawing the cover 22 from its container 20 through a slot for the purpose and covers the truck completely as is indicated in FIG. 3. Any kind of hook may be used to hold the sides of the cover in position of this should be desired but of course the bail itself holds the cover down at the back end of the truck in the region of the member 14 as in FIG. 3.

The cover is wound on a shaft 36 and this is in continuous engagement with a sprocket 38 about which is trained a chain 40 extending about a second sprocket 42 to which is connected a crank handle 44 used to drive the chain to wind the cover back into housed position in container 20 against the action of the springs at 34. When the cover is so located, a convenient and positive acting lock is provided which holds the parts in this position until once more released to cover the contents of the truck.

This lock comprises a block or the like indicated at 46. This block is pivoted as at 48 to a plate 50 which mounts the sprockets 38 and 42 and chain 40. Block 46 is provided with a manually actuated manipulating handle 51 and it has a locking pin 52 and a fiber or the like brake member 54 which is in extension thereof at the opposite side of the pivot support 48 from the handle 51. This sprocket 42 is mounted in spaced relation with respect to the plate 50, see FIG. 6. The block 46 and the brake shoe 54 lie to the rear of sprocket 42, the pin 52 however extending outwardly toward the observer in FIGS. 4 and 5 to act as a locking means between the teeth of the sprocket wheel 42 as illustrated in FIG. 5.

With the cover housed in its cylindrical container 20, the handle 51 is brought down engaging pin 52 between two teeth of sprocket 42 and firmly held in position by the sprocket chain 40. There is no chance for the pin 52 to vibrate out of engagement with the sprocket 42 under any circumstances as the parts are held in this position very rigidly by means of the sprocket and chain, and in turn the chain holds the pin 52 to the sprocket 42.

However when it is desired to release the lock and allow springs 34, 34 to spread the cover over the truck, the handle 51 is moved in a clockwise direction to the position shown in FIG. 4 where pin 52 is now completely released from any association with respect to the sprocket teeth. By pushing further upwardly on the handle in FIG. 5, the brake shoe 54 can be applied to the shaft 56 (or hub) of sprocket 42 so as to snub the action of the bail 24, 26 in its motion toward the rear of the truck body.

As shown in FIG. 7, the cover which may be generally made of canvas is provided with rubber shock cords 58, 58 which extend across it from side edge to edge. The canvas is indicated at 60. These shock cords tend to draw the edges of the canvas inwardly so that it is easily housed in the cylindrical container but at the same time the side edges thereof at 62, 62 can be pulled outwardly and draped over the edges of the truck as is indicated in FIG. 3 so as to completely enclose the contents thereof. In addition to this of course any kind of hooks can be used in cooperation with grommeted holes 64, 64 to hold the canvas in position against the action of the rubber shock cords. However, when the cover is released from the truck it will ruffle centrally to some extent and then it is easily spooled into the cylindrical housing at 20 by crank 44.

I claim:
1. In combination with an open-top vehicle body, a cover roll assembly mounted on the vehicle in a position at one end of said body, said roll assembly comprising a shaft, a flexible vehicle body cover adapted to be rolled up on said shaft and extending substantially across the width of the vehicle body, a bail assembly comprising a pair of spaced generally parallel legs pivotally mounted one at each side of said vehicle body, a cross rod connecting said legs completing the bail, means connecting said cross rod to one end of said flexible body cover, power means to swing said legs moving the cross rod from one end of the vehicle body to the other end and therefore unrolling said cover from the shaft, so as to draw said cover from one end to the other of the vehicle body, a crank to re-roll the cover onto the shaft, a sprocket on which the crank is mounted and a chain on the sprocket, a second sprocket mounted on the roll shaft and being driven by said chain, and a lock for the crank, said lock comprising a detent movably mounted on the vehicle body and having a selective position in engagement between teeth on a sprocket in a position where it is also engaged and removably held by the chain.

2. The combination of claim 1 including a brake on the lock for the crank.

3. The combination of claim 1 including a brake on the lock for the crank, said brake and lock comprising a pivoted member mounted in association with one of said sprockets and having a brake member selectively applied to the sprocket or removed therefrom.

4. The combination of claim 1 including a brake for the crank, said lock being mounted on the brake, and there being means mounting the lock and brake so that the lock is operable alternately with the brake.

5. In combination with an open-top vehicle body, a cover roll assembly mounted on the vehicle in a position at one end of said body, said roll assembly comprising a shaft, a flexible vehicle body cover adapted to be rolled up on said shaft and extending substantially across the width of the vehicle body, a bail assembly comprising a pair of spaced generally parallel legs pivotally mounted one at each side of said vehicle body a cross rod connecting said legs completing the bail, means connecting said cross rod to one end of said flexible body cover, power means to swing said legs moving the cross rod from one end of the vehicle body to the other end and therefore unrolling said cover from the shaft, so as to draw said cover from one end to the other of the vehicle body, said cover being wider than the truck body, elastomeric means extending across said cover and tending to draw in the edges thereof so that it is normally of less width than in its fully extended condition, in which it is capable of being draped over the side edges of the truck.

6. The combination of claim 5 including means holding the draped-over parts of the cover in position on said truck body.

7. In combination with an open-top vehicle body, a cover roll assembly mounted on the vehicle in a position at one end of said body, said roll assembly comprising a shaft, a flexible vehicle body cover adapted to be rolled up on said shaft and extending substantially across the width of the vehicle body, a bail assembly comprising a pair of spaced generally parallel legs pivotally mounted one at each side of said vehicle body, a cross rod connecting said legs completing the bail, means connecting said cross rod to one end of said flexible body cover, power means to swing said legs moving the cross rod from one end of the vehicle body to the other end and therefore unrolling said cover from the shaft, so as to draw said cover from one end to the other of the vehicle body, wherein the power means comprises a compression spring constructed and arranged to push on at least one leg of the bail to extend the cover to vehicle body covering position, means to re-roll the cover onto the shaft, compressing the spring, and uncovering the vehicle body, a cylinder substantially housing the spring, means pivoting said cylinder with relation to the truck body adjacent said axis, and means connecting the spring to a leg of the bail.

8. The combination of claim 7 wherein the means pivoting said cylinder with relation to the truck body is located substantially below said axis.

9. The combination of claim 7 wherein said connection means is offset from the axis of said respective leg and comprising a rod connected to the leg and slidably associated with the cylinder, said rod having an end in the cylinder engaged by the spring.

References Cited

UNITED STATES PATENTS

| | | | |
|---|---|---|---|
| 128,891 | 7/1872 | King | 16—72 |
| 1,632,924 | 6/1927 | Schmidt | 16—72 |
| 2,591,186 | 4/1952 | Neitzke | 296—98 |
| 2,811,321 | 10/1957 | La Barre | 242—86.52 |
| 2,997,967 | 8/1961 | Malapert | 296—98 |
| 3,021,894 | 2/1962 | La Due | 296—98 |

LEO FRIAGLIA, Primary Examiner

R. R. SONG, Assistant Examiner